P. S. WARMAN.
RADIATOR GUARD.
APPLICATION FILED AUG. 13, 1918.
1,306,364.
Patented June 10, 1919.
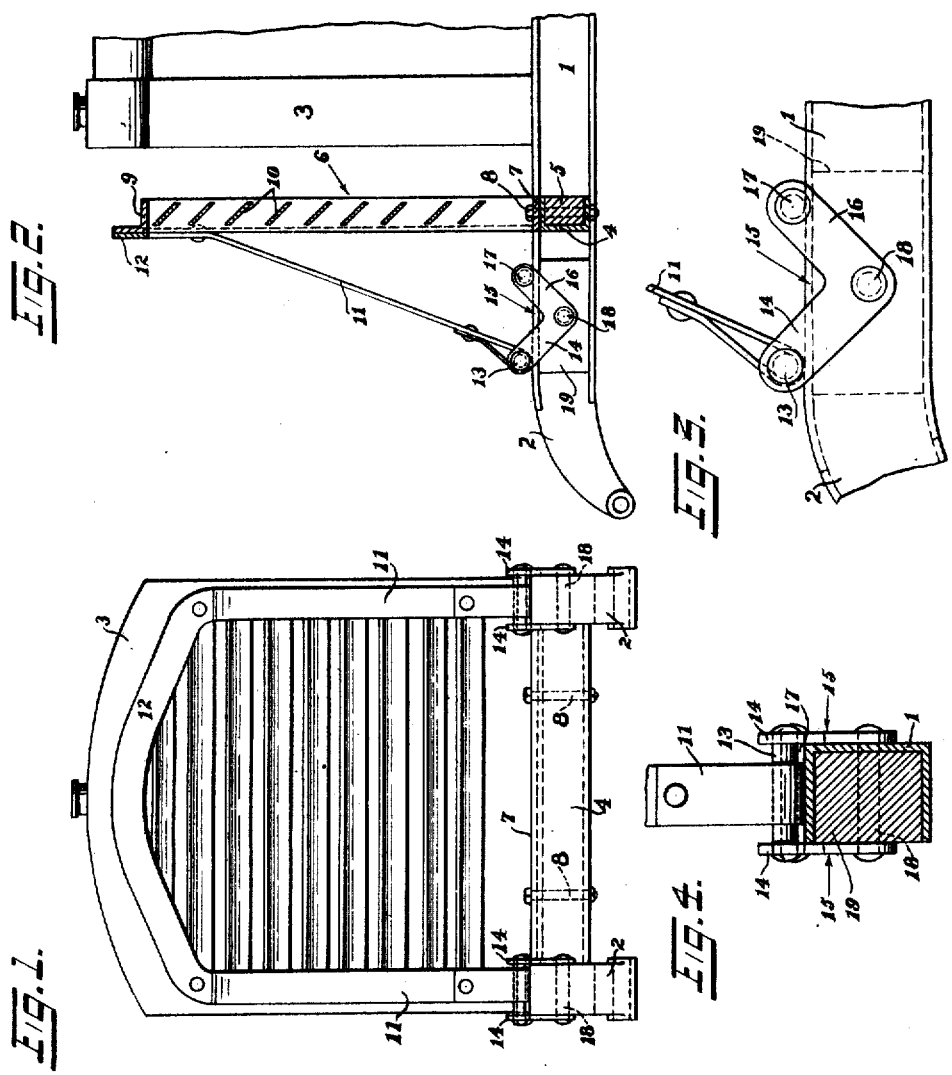
Inventor:
Percy S. Warman
By his Atty. Gustav Drews

UNITED STATES PATENT OFFICE.

PERCY S. WARMAN, OF ROSELLE, NEW JERSEY, ASSIGNOR TO THE FUNDAMENTAL CORPORATION, OF NEW YORK, N. Y., A CORPORATION OF NEW YORK.

RADIATOR-GUARD.

1,306,364.     Specification of Letters Patent.     Patented June 10, 1919.

Application filed August 13, 1918. Serial No. 249,628.

*To all whom it may concern:*

Be it known that I, PERCY S. WARMAN, a citizen of the United States, residing in Roselle, county of Union, and State of New Jersey, have invented certain new and useful Improvements in Radiator-Guards, of which the following is a specification.

This invention relates in general to radiator guards for auto trucks, and more particularly to the means for fastening such guards to the side rails of truck chassis.

Among the main objects of the present invention, it is aimed to provide a radiator guard and the fastening means therefor which can with facility be secured in place on the side rails of an auto truck, making it especially adapted for use with the type of auto truck chassis having two forwardly extending horns.

The present invention especially contemplates providing a radiator and the fastening means therefor requiring a minimum number of bolts for fastening the same in place and the consequent saving in labor in providing bolt holes and the like in the truck chassis.

These and other features, capabilities and advantages of the invention will appear from the subjoined detail description of one specific embodiment thereof illustrated in the accompanying drawings in which Figure 1 is a fragmental front elevation showing the radiator guard in place.

Fig. 2 is a fragmental sectional view of the same.

Figs. 3 and 4 are enlarged fragmental details showing parts of the fastening means.

In the present embodiment, there is shown a chassis having channeled side rails 1 terminating in forwardly extending horns 2 on which the radiator 3 is mounted in the usual manner. Just forwardly of the radiator 3 there is provided a channel bar 4 extending between the rails 1 and fastened in such bar as shown there is preferably formed a filler 5. On this cross bar 4 and extending over the rails 1, there is mounted the radiator guard proper 6 comprising essentially a lower bar 7 fastened to the channel bar 4 and filler 5 by the bolts 8, a bordering frame 9, and downwardly and rearwardly inclining transverse bars 10. The inclination and position of the bars 10 relative to the chassis and radiator, will not only serve to protect the radiator against injury in case of collision but will also deflect any stones or the like that may be thrust upwardly from the road or otherwhere in the direction of the radiator.

To the upper sides of the bordering frame 9, there are secured the metal straps 11 which in the present instance form the forward continuations of the intermediate border plate 12. The lower forward ends of the straps 11 are secured to the rails 1, in the present instance, by being looped to receive the bolts 13 formed on the forwardly extending fingers or arms 14 of the brackets 15.

The brackets 15 are formed in pairs, a pair for each rail 1, with one bracket on each side of a rail. The brackets, each comprise a forwardly extending arm 14 and an arm 16 extending rearwardly at an angle to said arm 14, each pair of brackets having the free ends of its front arms 14 connected by a bolt 13, the free ends of its rear arms 16 connected by a bolt 17, and its intersecting portions connected by a bolt 18. The bolts 13 and 17 extend above the upper surfaces of the rails 1, while the bolt 18 extends through the channeled portion of the rail 1 and the block filler 19 located in said channeled portion of the rail 1.

From the foregoing it will be seen that whenever any strain is received by the guard through collision or the like, it will be transmitted through the straps 11 to the brackets 15 which will tend to rock about the bolts 18 and then the strain will be further transmitted to the upper surfaces of the rails 1 by means of the bolts 16.

It is obvious that various changes may be made to the details of construction without departing from the general spirit of the invention.

I claim:

1. The combination with a guard for automobile radiators mounted on the chassis of an automobile, of metal straps extending from the upper end of said guard down to said chassis, brackets secured to said chassis, and bolts on said brackets, the lower ends of said strap secured to said bolts.

2. The combination with the chassis of an automobile having two forwardly extending horns, of a guard mounted on said chassis, means for fastening the lower end of said guard to said chassis, brackets on the horns of said chassis, bolts on said brackets, and straps extending down forwardly from the upper end of said guard to and fastened to said bolts.

3. The combination with the chassis of an automobile having two forwardly extending horns, of a guard mounted on said chassis, means for fastening the lower end of said guard to said chassis, brackets on said chassis having fingers extending at an oblique angle to one another, means for securing said brackets to said horns, bolts extending through the free ends of one of said fingers, and straps extending down from the upper end of said guard to and fastened to said bolts.

4. The combination with the chassis of an automobile having two forwardly extending horns, of a guard mounted on said chassis, means for fastening the lower end of said guard to said chassis, brackets having fingers extending at an oblique angle to one another, means for fastening said brackets at the intersection of said fingers, bolts extending through the free ends of said fingers and across the upper surfaces of said horns, and straps extending from the upper end of said guard down to and fastened to the forwardly positioned fingers of said brackets.

5. The combination with the chassis of an automobile having two forwardly extending channeled horns, of a guard mounted on said chassis, means for fastening the lower end of said guard to said chassis, blocks disposed in the channeled portions of said horns forwardly of said guard, brackets having fingers extending at an oblique angle to one another, means for extending through said horns, blocks and brackets to fasten said brackets at the intersection of said fingers, bolts extending through the free ends of said fingers and across the upper surfaces of said horns, and straps extending from the upper end of said guard down to and fastened to the forwardly positioned fingers of said brackets.

6. The combination with the chassis of an automobile having channeled side rails, of a radiator guard mounted on said side rails, blocks disposed in said channeled side rails, brackets secured to said blocks and side rails, and straps extending from the upper end of said guard down to said brackets and secured thereto.

7. The combination with the chassis of an automobile having channeled side rails, of a radiator guard on said side rails, blocks disposed in said channeled side rails, straps extending from the upper end of said guard down to said side rails, brackets secured to said blocks and said rails, and bolts on said brackets, the lower ends of said straps secured to said bolts.

PERCY S. WARMAN.

Copies of this patent may be obtained for five cents each, by addressing the "Commissioner of Patents Washington, D. C."